Patented Mar. 25, 1930

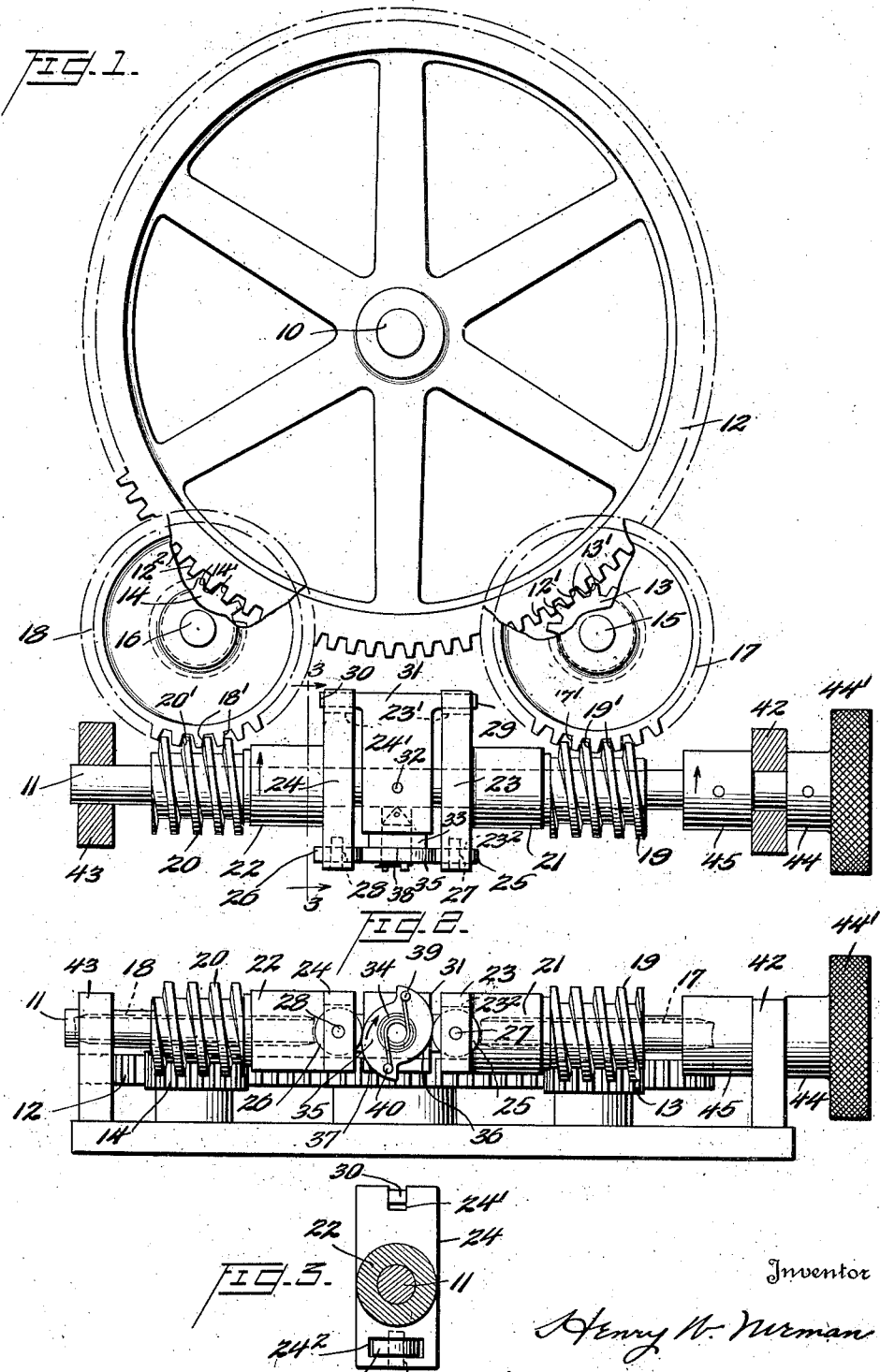

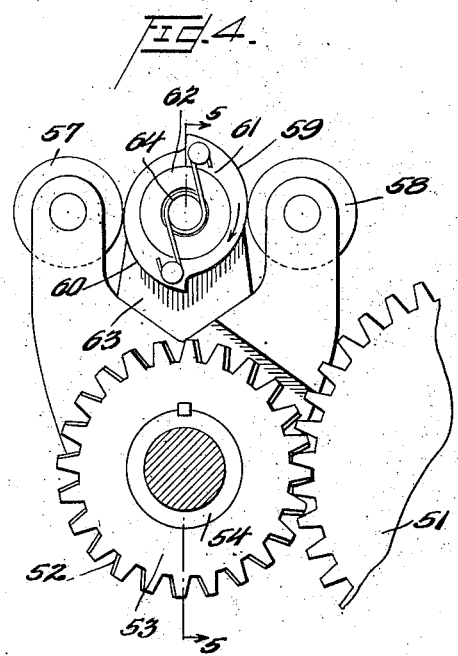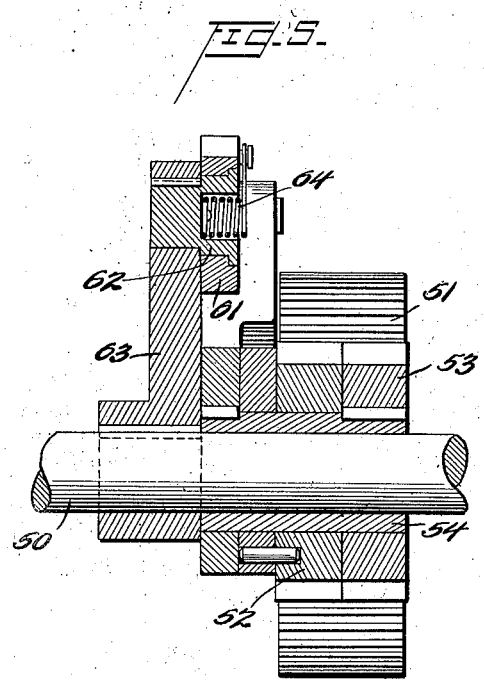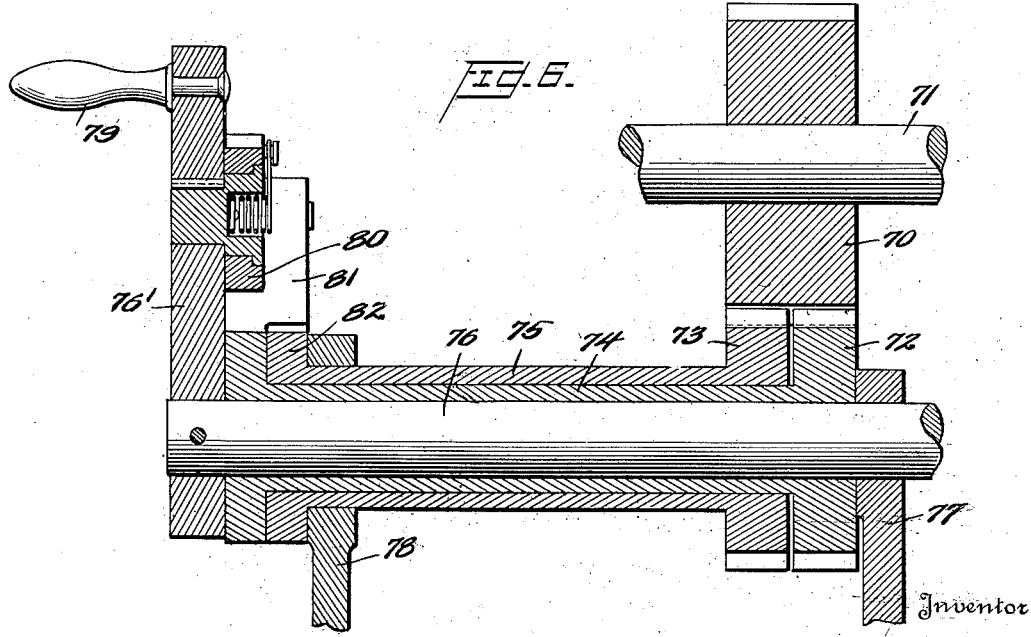

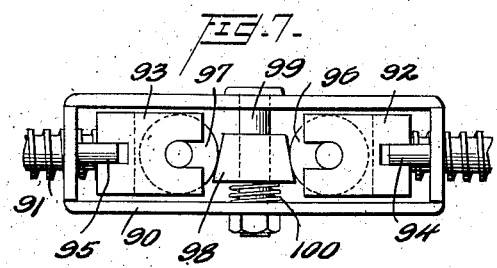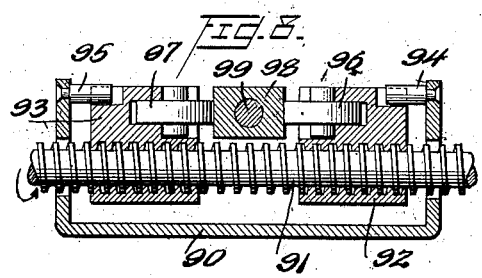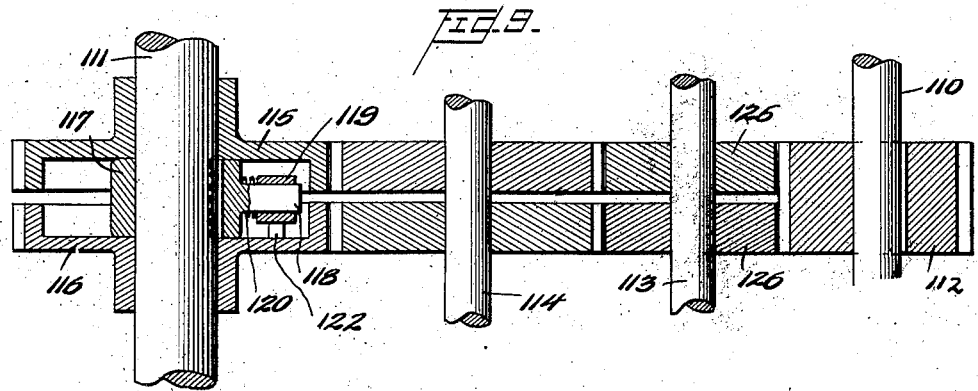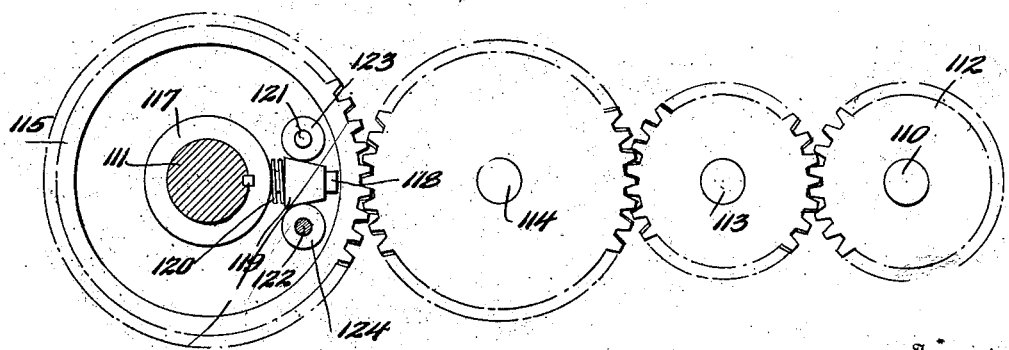

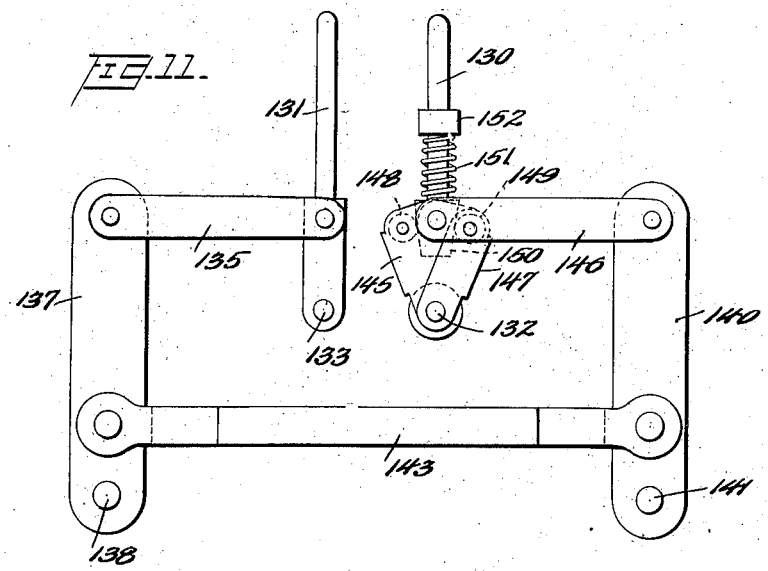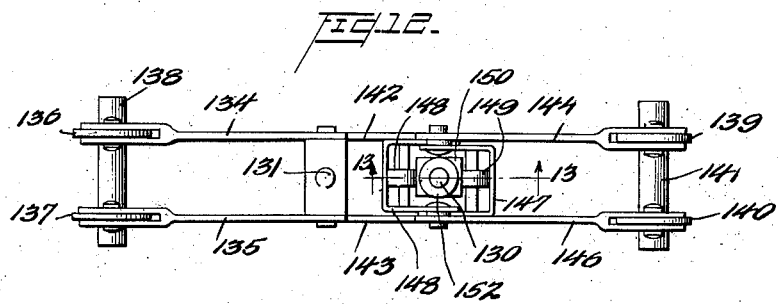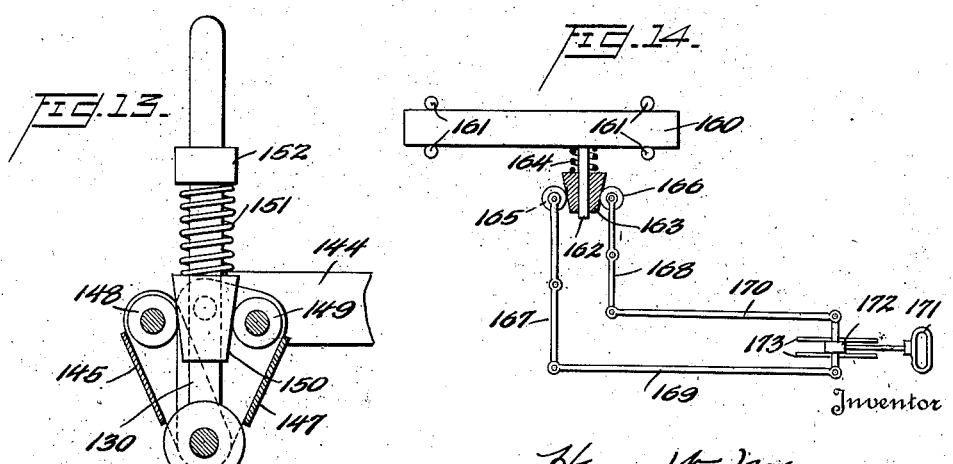

1,751,650

UNITED STATES PATENT OFFICE

HENRY W. NIEMAN, OF BETHLEHEM, PENNSYLVANIA

POWER-TRANSMISSION MECHANISM

Application filed June 1, 1927. Serial No. 195,811.

The present invention relates to power transmission mechanism, and particularly to driving connections between driving and driven members which are adapted to be reversed in direction of drive from time to time.

In many types of modern machines it is quite necessary to effect a reversal of movements of the whole or a part thereof at frequent intervals. For instance a gun must be traversed from side to side and elevated or depressed in properly pointing the same, a lever for operating a valve or other instrumentality is operable in two directions and a feed screw for advancing or retracting the cutting tool of a lathe or planer must necessarily be reversible. Many other types of machines having reversible driving and driven elements might be mentioned. Heretofore great difficulty has been met with in the accurate control of the movement and position of the driven member because of the presence of lost motion, commonly known as "back lash" in the driving connections. Such lost motion or back lash is caused not only by faulty or loose initial construction, but also by wear of the various parts and expansion and contraction of such parts due to variations in temperature. While the greatest care may be employed in the initial construction of a machine with the end in view of securing accuracy of fit of the cooperating driving and driven parts so that the machine will accurately function at the outset, it is obvious that inaccuracies arising from wear of the parts and expansion and contraction due to temperature variation will nevertheless destroy the accuracy of the machine unless compensated for in some manner.

This problem has long been appreciated and various attempts have been made to solve it, such as for instance, the provision of a split gear in a gear train, the parts of which are forced in opposite directions by a spring so that there is no lost motion between the teeth of such gear and the teeth of a solid gear with which they mesh, upon reversing the direction of drive. As only one portion of the split gear can be keyed to the shaft upon which it is mounted, however, it follows that driving in one direction must be effected through the spring and the driving force cannot be so great that the action of the spring is overbalanced. This greatly limits the field of application of this type of gear. Again, it will be apparent that increasing the strength of the spring also increases the "pinching" effect of the teeth of the split gear upon the teeth of the mating gear, thereby causing excessive friction and wear.

The object of the present invention is to provide a driving connection between any two movable members whereby one may be driven by the other in either of two directions and which connection includes means for automatically taking up and completely eliminating lost motion or "back lash", yet which at the same time is entirely positive in both directions of drive. By means of the present invention two members may be so interconnected that one may be positively driven by the other in either direction and lost motion due to causes either present at the outset or which subsequently develop, compensated for and eliminated. Conversely when the driving connection tends to become too "tight" as distinguished from one which is too loose, as may occur when there is a considerable expansion due to heat, the present invention provides means for relieving the excessive binding action of the parts thereby preventing excessive friction or wear.

The invention contemplates the combination with the driving and driven members of two rigid connecting elements and means mounted upon one of said members and cooperating with said elements to not only transmit the driving forces, but to automatically act upon said connecting elements in such manner that back lash or lost motion in the entire system is eliminated. The invention will be more specifically described in the following specification and various embodiments are also illustrated in the drawings. It will be apparent that it may have a large number of different forms depending upon the nature of the driving and driven members which, of course, vary widely in structure because of the applicability of the invention to many different types of machines in the mechanic arts. The invention is not only useful when applied to machines of delicate type in which extreme accuracy is sought, but is also applicable to the largest and heaviest types in which extreme accuracy is relatively unimportant. When applied to machines of this last mentioned class, the invention not only promotes accuracy, but is largely instrumental in reducing wear of the parts as well as vibration and chatter, thus promoting long life, noiselessness of operating, and perfection of product.

In the drawings:

Figure 1 is a top plan view, partly broken away, of an arrangement of gearing by means of which a large gear may be driven in either direction from a worm shaft without the occurrence of back lash or lost motion upon reversal;

Figure 2 is a front elevation of the same;

Figure 3 is a section on line 3—3 of Fig. 1;

Figure 4 is a front elevation of another form of gear drive in which the invention has been incorporated;

Figure 5 is a section view of the same taken on line 5—5 of Fig. 4;

Figure 6 is an axial section through a modified form of gear drive mechanism in which the invention is incorporated;

Figure 7 is a top plan view of a screw feed mechanism such as might be employed with a lathe, planer, or the like, having the improved driving connection between the feed screw and tool holder;

Figure 8 is a longitudinal section through the same;

Figure 9 is a sectional view through the axes of a number of intermeshing gears showing the application of the principle of the invention to a train of gears;

Figure 10 is a front elevation of the same;

Figure 11 is a side elevation of a linkage in which means is provided for automatically compensating for wear in the pivots and for expansion and contraction of the metallic parts;

Figure 12 is a top plan view of the same figure;

Figure 13 is a section on line 13—13 of Fig. 12; and

Figure 14 is a view, partly in side elevation and partly in section, of a modified form of linkage.

That form of the invention which is illustrated in Figs. 1 to 3 inclusive, may well be utilized in connection with ordnance material, for instance, and comprises essentially a driven shaft 10 and a drive shaft 11 together with intermediate gearing by means of which the former can be driven by the latter in either direction without the occurrence of back lash at any time, for any cause.

Fixed on the driven shaft 10 is a large gear 12, the teeth of which mesh with the mating teeth of two spaced gears 13 and 14 mounted upon stub shafts 15 and 16 respectively, the axes of which shafts are disposed parallel to the axis of shaft 10. Also fixed on stub shafts 15 and 16 and in a plane above the plane of gear 12 are worm wheels 17 and 18 respectively.

These worm wheels mesh with cooperating worms 19 and 20 formed upon cylindrical sleeve-like members 21 and 22 which are mounted upon the drive shaft 11, but which are free to move thereon both longitudinally and circumferentially. Cylindrical members 21 and 22 are provided with enlarged or flanged inner ends 23 and 24, these flanges being conveniently substantially rectangular, as shown in Fig. 3. They are notched respectively at corresponding ends, as at 23' and 24', and are also provided at their opposite corresponding ends with rectangular recesses 23$_2$ and 24$_2$ within which recesses or apertures are positioned rollers 25 and 26, these rollers being respectively mounted for rotation upon pins 27 and 28.

Into the recesses 23' and 24' extend the laterally projecting arms 29 and 30 of a block 31, these arms fitting closely within the recesses but being slidable therein. Block 31 has a cylindrical recess which receives shaft 11 and is secured to this shaft for rotation therewith, for instance by means of a pin 32.

The end of the block remote from the arms 29 and 30 has a reduced cylindrical portion 33 and a further reduced portion 34, the outer surface of which is cylindrical and centered on an axis disposed at right angles to the axis of shaft 11. Rotatably mounted upon the cylindrical portion 34 of the block is a rotatable member 35 having oppositely disposed involute faces 36 and 37 which bear respectively against the rollers 25 and 26. The ends of a coil spring 38 are connected to this member 36 at 39 and 40 and the body of this spring extends into the cylindrical aperture formed axially within the cylindrical portions 33 and 34 of the block. The body of the spring within this cylindrical recess is secured to block 31 at one point and the spring is normally tensioned so that it tends to rotate member 37 in the direction of the arrow which appears in Fig 2. The drive shaft 11 is mounted in bearings 42 and 43 and collars 44 and 45 fixed to the shaft on opposite sides of member 43 to prevent endwise movement thereof. I have shown an enlargement 44' of collar 44, the outer cylindrical surface of which is knurled so that it may be conveniently grasped by the hand for manual rotation. The drive shaft may be driven, however, by any suitable means, either manually operated or power operated.

Assuming that the drive shaft 11 is stationary, it will be apparent that the spring 38, acting through the movable part 35 with its involute cam surfaces 36 and 37, tends to thrust sleeves 21 and 22 in opposite directions. Any outward movement of these sleeves is only slight, however, due to the intermeshing of the worm 19 with the teeth of worm wheel 17. However, this slight spring thrust assures such movement of the members 21 and 22 that the right hand surfaces 19' of the worm threads 19 are in contact with the left hand surfaces 17' of the teeth of worm wheel 17 (as viewed in Fig. 1) and that the left hand surfaces 20' of worm threads 20 are in contact with the right hand surfaces 18' of the teeth of worm wheel 18. The spring thrust further tends to rotate gears 17 and 18 in opposite directions with the result that the left hand surfaces 13' of the teeth of pinion 13 abut against the right hand surfaces 12' of the teeth of large gear 12 and the right hand surfaces 14' of the teeth of pinion 14 abut against the left hand surfaces 12$_2$ of the teeth of large gear 12.

It thus appears that the action of the spring is effective when no driving force is being transmitted, to cause pinions 13 and 14 to exert slight but oppositely directed forces upon the teeth of gear 12 although at widely separated points. If power is transmitted to the drive shaft to cause it to rotate in the direction of the arrow (Fig. 1) motion will be immediately imparted to large gear 12, since the sleeve 21 is caused to rotate with the drive shaft due to the interengagement of flange 23 and arm 29 of block 31. The faces of the interengaging teeth having been previously moved into effective contact, there is no delay in the response of shaft 10 to the movement of shaft 11 such as would follow were the effective faces of the several teeth not already in engagement when the driving force is applied. In other words, rotation of shaft 10 begins simultaneously with that of shaft 11.

As shaft 11 rotates the action of worm 19 on the teeth of worm wheel 17 is, of course, such that the sleeve 21 has a tendency to move axially of shaft 11 toward the left (Fig. 1). Such movement is prevented, however, by the part 36 mounted on block 31, the involute face 36 of which has continuous contact with roller 25 and which constitutes a non-yielding abutment for the roller sleeve 21, the cylindrical inner face of the center recess of part 36 frictionally binding upon the outer surface of the cylindrical spindle-like portion 34 of the block upon which it is mounted so that part 36 may not rotate.

Of course, during the rotation of shaft 11 in the direction indicated, the sleeve 22 and worm 20 are also rotated, together with gear 18 and pinion 14. Here, however, the pinion 14 is actually driven by the large gear 12 and the teeth of gear 18 merely follow the worm 20 and are not driven thereby. This is because those faces of worm 20 (the right hand faces) which would necessarily be active in rotating gear 18 for a movement of shaft 11 in the direction indicated, are not actually in contact with the corresponding faces of the teeth of gear 18, but on the other hand, the ineffective faces of the worm (left hand faces) are in contact with the teeth of gear 18. As the result, the left hand worm 20 as well as pinion 14 and gear 18 rotate idly and the entire driving force is transmitted to shaft 10 through worm 19, gear 17 and pinion 13. In such action, there is no thrust of gear 18 or worm 20 tending to move sleeve 22 toward the right, at least no thrust at all comparable in magnitude to the thrust of sleeve 21 toward the left, that is, there is no possibility of the thrust of the roller 26 upon the movable member 36 balancing the thrust of the roller 25 on this same part. If these thrusts were balanced, either wholly or to a substantial degree, of course, the frictional binding or resistance to rotation of movable part 36 upon its supporting spindle would disappear and the movable part 36 would be free to rotate. As it is, however, part 36 constitutes a non-yielding abutment which resists the thrust of sleeve 21 so long as the parts are moving in the direction of the arrow.

If the direction of rotation of drive shaft 11 is reversed, worm 19, gear 17 and pinion 13 immediately become inactive and worm 20, gear 18 and pinion 14 immediately become effective in driving shaft 10 in the reverse direction. Moving part 35 is then a non-yielding abutment resisting the thrust of sleeve 22 and the reversal of movement is effected without any lost motion whatever between shafts 10 and 11, the interengaging faces of the worm 20, teeth of gear 18, and teeth of pinion 14 having been previously brought into engagement by spring 38, and in fact, continuously held in engagement, as before pointed out, even during the time that the drive was transmitted to shaft 10 through gear 17 and pinion 13.

The part or member 35, it will be seen, under the influence of spring 38 constitutes a continuously present and active take-up member which, by thrusting the sleeves 21 and 22 in opposite directions, causes the active faces of the intermeshing teeth of both sets of connecting elements to be in continual engagement. Should any wear occur in the teeth of the worm wheel, gears or pinions, it is immediately taken up by slight rotation of part 35 when the mechanism is at rest and the thrust of the rollers 25 and 26 relieved. The action is entirely automatic. Should there be, during the operation of the mechanism, any simultaneous thrust of rollers 25 and 26 on the part 35, such as for instance, as might be caused by expansion of gear 12 due to heat or because of the passage of foreign matter such as a solid lump between the teeth of pinion 14, or pinion 13, and gear 12, part 35 will be caused to rotate slightly to relieve the thrust. It constitutes a non-yielding abutment only when there is a substantially unbalanced force impressed upon it, but as has before been explained, balancing of the opposed force relieves the frictional binding of part 35 upon its supporting spindle and, due to the action of the rollers on the involute faces 36 and 37, results in rotation of the part in a direction opposed to the arrow shown in Fig. 2.

The mechanism just described is applicable to precision instruments and to heavy machinery and is advantageous in both instances. In the case of the precision instrument there is at no time any perceptible back lash or lost motion in the system connecting the drive and driven shafts. In the case of the relatively heavy machine, wear is immediately compensated for so that continual use of the machine does not result in inaccuracies, noise or chatter from such causes.

In Figs. 4 and 5, a somewhat different type of gearing is illustrated, in which means is provided for the elimination of lost motion or back lash upon reversal of movement. The shaft 50 may be either the driving or the driven shaft and the gear 51 may be either the driven or the driving gear, this form of gearing being reversible in this respect as well as having a reversible drive member as in the case of the first modification described. Gear 51 is a solid gear and meshing with the teeth of this gear are the teeth of two smaller gears 52 and 53 which, taken together, have substantially the same width as the teeth of solid gear 51 and which together may be properly termed a "split gear". One gear 53 is keyed to a sleeve 54 which is rotatably supported upon shaft 50 and the second of the smaller gears 52 is rotatably mounted upon the cylindrical outer surface of this sleeve. Fixed on shaft 50 is an arm 63 which carries at its outer end a spindle carrying a rotatable part 61 having oppositely facing involute surfaces 59 and 60. A spring 64 normally tends to rotate the part 61 in the direction of the arrow (Fig. 4) to rotate these gear sections in opposite directions and hence to pinch the teeth of the gear 51 between the mating teeth of gears 52 and 53.

Assuming gear 51 to be the drive gear, and that shaft 50 is to be driven, it will be apparent that initial movement of gear 51 in either direction is immediately followed by movement of shaft 50 without delay or lost motion, since whichever the direction of movement of gear 51, the effective surfaces of the teeth of one section of the split gear are already in contact with the cooperating tooth surfaces of the solid gear and the motion of the driven member of the split gear is immediately transmitted through its associated arm into the part 59 and thence through arm 63 into shaft 50. So long as one roller only is active in exerting a force on member 59, that part is stationary and comprises a non-yielding abutment. Should there be a tooth (or teeth) of drive gear 51 thicker than the others, however, it will be seen that the sections 52 and 53 of the split gear will be so moved relatively to each other that rollers 57 and 58 will be simultaneously urged against part 61. This part, having the frictional binding against its supporting hub 62 relieved, at least in large part, due to the balancing or partial balancing of opposing forces, will rotate instantly through a distance sufficient to relieve the binding or pinching action of the teeth of the split gear upon the thick tooth of the drive gear. Likewise, when wear occurs due to long usage of the gears, and the teeth become smaller, the spring 64 urges the rollers 57 and 58 further apart and this makes certain that the teeth of the drive gear 51 are at all times lightly pinched between the teeth of the split gear. There is, of course, no lost motion or back lash at any time in the system of gears just described, and it is also obvious that shaft 50 may be a drive shaft and gear 51 a driven gear when desired.

It is sometimes desirable, due to lack of space in the immediate vicinity of the gear train, to arrange to have the movable part of the mechanism at a distance. This is rendered quite possible by a construction such as shown in Fig. 6. Here 70 indicates a driven gear fixed on shaft 71 and 72 and 73 indicate the two smaller gears or the two sections of the split gear. These gears are formed integral with sleeves 74 and 75 respectively which are concentrically arranged upon a shaft 76 mounted in bearings 77 and 78, bearing 78 indirectly supporting the shaft through the concentric sleeves 74 and 75. To the end of the shaft 76 is keyed or pinned a crank arm (or other type of power arm) 78 which may conveniently have an operating handle 79 at its outer end. This arm carries a movable part 80 which may conveniently be of the type shown in Figs. 1 and 2, and 4 and 5. The adjacent ends of the sleeves 74 and 75 likewise have rigid arms 81 and 82 which carry respectively rollers 83 and 84 which bear against the opposed involute faces of the part 80.

The action of the mechanism just described is as fully explained in connection with Figs. 4 and 5, split gear sections 72 and 73 pinching lightly the teeth of the driven gear 70. Motion of the crank arm 78 in either direction is instantly followed by motion of driven gear 70, there being no back lash or lost motion at any time due to wear or expansion or other causes. The movable member may, by means such as disclosed in Fig. 6, be placed at any convenient distance from the sections of the split gear, which is of considerable advantage in adapting the invention to various complica..d types of machines.

A further advantage of the invention resides in the fact that it is unnecessary to initially construct the intermeshing gears without substantial clearances. In other words, where the invention is applied to a system of gearing it is unnecessary to exercise great care in cutting the teeth, since imperfections and excessive tooth clearances are automatically compensated for by the improved driving connection.

A screw feed mechanism such as shown in Figs. 7 and 8, may be conveniently applied to grinding machines, planers and lathes for feeding the grinding wheel or cutting tool to the work. A box-like yoke is indicated at 90, this member being apertured at its ends to loosely receive the threaded feed screw 91. Within the yoke 90 are spaced nuts 92 and 93 respectively, having cylindrical threaded apertures the teeth of which mesh with the teeth of the worm of the feed screw shaft 91. These nuts 92 and 93 are prevented from rotating relatively to the yoke 90 by pins 94 and 95, which pins, however, permit limited movement of the nuts longitudinally of the screw 91, since they merely extend into slots in these members.

Each nut carries a roller, these rollers being indicated at 96 and 97 respectively, and which rollers bear upon the opposed inclined faces of a wedge-like part 98 which is slidably mounted upon a spindle 99 mounted transversely in the yoke 90. A light compression spring 100 normally urges the wedge part 98 axially of its supporting spindle 99, thereby tending to separate rollers 96 and 97.

As a result of this slight pressure of the spring, therefore, the nuts 92 and 93 are thrust in opposite directions so that they tightly engage, respectively, opposite faces of the thread upon feed screw 91. Assuming this screw to be rotated in the direction of the arrow in Fig. 8, it is apparent that nut 92 will be effective to cause movement of the yoke 90 toward the left and that nut 93 will be merely forced ahead idly by the thrust of wedge 98 and roller 97, but maintains at all times light contact between the forward faces of its teeth and the rearward (right hand) face of the worm thread. The thrust of roller 96 is unbalanced and wedge 98 has no tendency to move on shaft 99, but constitutes a non-yielding abutment.

Reversal of the direction of rotation of the feed screw 91 causes nut 93 to become effective in driving the yoke, nut 92 moving idly. At the moment of reversal of direction of drive, therefore, there is no failure of the yoke to immediately respond, due to lost motion or back lash. A tool or grinding wheel may therefore be positioned relatively to the work with the greatest accuracy and when positioned cannot depart therefrom, that is, it cannot push forward into soft spots in the work as now frequently occurs with screw feeds of the type now on the market.

In Figs. 9 and 10, widely separated drive and driven shafts are shown to be connected by a train of gears. The drive shaft is indicated at 110 and the driven shaft at 111 although it will be realized that the drive shaft may be driven and the driven shaft may become the drive shaft if desired. Gear 112 is a solid gear and is fixed on shaft 110. Intermediate counter shafts 113 and 114 support the individual small idler gears in pairs, each pair comprising in reality a two-section split gear. The sectional gears are free to rotate on shafts 113 and 114 respectively. Likewise on shaft 111 are mounted two sections 115 and 116 of a split gear, these sections being free to rotate on the supporting shaft. They are, however, hollowed out as shown and enclose a cylindrical block 117 keyed to shaft 111, which block is provided with a radially extending cylindrical spindle 118. Slidably mounted on spindle 118 is a wedge 119 normally thrust outwardly by the light pressure of spring 120. The respective gear sections 115 and 116 are provided with spindles 121 and 122 which carry respectively rollers 123 and 124, the cylindrical surfaces of which bear against the inclined faces of the wedge.

The action of the connection is here very much the same as in the preceding instances, the gear sections 115 and 116 being rotated relatively to each other by the action of spring 120, which relative rotation is transmitted to the sections of the intermediate gears mounted on shafts 113 and 114, with the final result that the continuous teeth of the solid gear 112 are lightly pinched between teeth of the sections of the adjacent idler gear, which sections may be conveniently designated 125 and 126. All play due to faulty initial tooth cutting, expansion due to heat, or wear of the tooth is automatically compensated for and the drive and driven shafts are caused to simultaneously rotate at all times notwithstanding frequency of reversal of direction of movement.

As it is frequently desired to transfer power by a linkage instead of by means of rotating gears and the like, I have illustrated by way of example, a form of linkage in which no lost motion or back lash occurs between driving and driven members. This is shown in Figs. 11, 12 and 13. Lever 130 may be designated the drive member and lever 131 the driven member although obviously either might be selected as the drive member and either may be the driven member. These levers are pivotally supported to rock about stub shafts 132 and 133. Motion is communicated from one to another by a series of links and levers.

Thus, to lever 131 are pivotally connected the ends of links 134 and 135, the opposite ends of these links being pivoted to levers 136 and 137, respectively, which are both mounted to rock upon a shaft 138. A second and parallel pair of levers 139 and 140 are mounted to rock upon a second stub shaft 141. A link 142 connects levers 136 and 139 and a link 143 connects levers 137 and 140 so that the pairs of levers are caused to move together. The upper end of lever 139 is connected by a link 144 to a rocker arm 145 and lever 140 is connected by link 146 to a second rocker arm 147, the rocker arms 145 and 147 being mounted to rock upon shaft 132. The rocker arms just mentioned carry respectively spaced rollers 148 and 149, the cylindrical surfaces of which bear upon the opposing inclined faces of a wedge member 150 slidably mounted upon the driving member 130 and which is urged downwardly by a light spring 151, the upper end of which abuts against a collar 152 on shaft 130.

Any play which might be present in the system of links and levers above set forth and which might result in lag of the driven lever upon actuation of the drive lever, is taken up by the wedge member 150, while at the same time, this wedge member constitutes a non-yielding abutment when lever 130 is rocked in either direction. If rocked to the right, for instance, the driving force is transmitted through roller 149 to rocker arm 147 and hence to the links and levers connected thereto, so that the driving force is instantly communicated to lever 131. Roller 148 merely follows, but maintains at all times a close contact with the wedge and hence when the direction of movement of lever 130 is reversed, roller 149 promptly becomes a following roller, and roller 148 the thrusting roller. As further wear occurs in the system of linkage, the wedge 150 automatically descends and compensates for it.

In Fig. 14 a slightly modified form of linkage is disclosed. Here a member 160, which may be any type of member such as a valve operating rod intended to be operated from a distant point, is shown to be mounted on supports 161 for movement axially. Depending therefrom and disposed at right angles thereto is a rod 162 on which is slidably supported a wedge 163 which is normally pressed downward by light expansion spring 164. Rollers 165 and 166 lie on opposite sides of and bear closely against the inclined faces of the wedge, these rollers being rotatably mounted on the upper ends of pivoted levers 167 and 168, respectively. The lower ends of these last mentioned levers are connected by links 169 and 170 to a handle 171 mounted for parallel movement as upon a slide 172 movable between fixed guides 173. It is quite obvious that movement of the handle 171 results in simultaneous movement of the rollers 165 and 166 and hence in movement of the member 160. Only one roller can exert a driving force upon the wedge 163 because of the actuation of lever 171 in one direction, and the action of one roller only causes the wedge to bind upon the system 162 so that it constitutes a non-yielding abutment. As wear occurs in the joints of the system, the wedge 163 will force its way downwardly, taking up any play and, both rollers 165 and 166 being in constant contact with the wedge, it is clear that there is no possibility of back lash or lost motion upon reversal of the movement of the operating lever 171.

In my co-pending application, Serial No. 79,737, filed January 7, 1926, for patent for "mechanical movement" are disclosed a considerable number of structures which might be substituted for the "moving part" of the driving connection, and its supporting means. In other words, various other forms of mechanism may be substituted for the moving part 35 of Fig. 1, with its involute faces or the wedge-like member 98 of Fig. 7. It is only necessary that each such part shall constitute a non-yielding abutment when an unbalanced pressure is exerted thereon, and shall yield when balanced or partially balanced pressures are exerted thereon. Coupled with these functions, of course, is a third function, i. e. such a movable part shall have the ability to act simultaneously upon two relatively movable members, such as the connecting elements of the present invention, to take up lost motion in the manner already described.

Structurally it may vary widely from the forms which have been herein suggested, and the driving and driven members may, of course, vary widely in their exact design and construction. They may be rotatable members or they may be designed for movement in translatory paths. The system may be non-reversible in so far as the driving and driven members are concerned, as is the result when a worm drive is employed as in the form of the invention shown in Figs. 1 to 3, or it may be reversible, that is, the functions of the drive and driven members may be interchanged, the drive member becoming the driven member, and vice versa. The connecting elements may furthermore have various forms, and generally speaking, the connecting elements are at least two in number, which elements function to transmit driving force from the driving to the driven member, that element which is for the time being the effective element being determined entirely by the direction of movement of the driving member. The connecting elements move substantially in unison, although they generally have the capacity for slightly relative movement.

Those embodiments of the invention which have been set forth by way of example, disclose various types of driving and driven members, connecting elements and movable parts for taking up the play in the driving connection, so that one skilled in the art may appreciate its adaptability. Further embodiments of the principle of the invention will readily suggest themselves, it being by no means limited to those forms which are disclosed, and in fact, being useful wherever machines having reversible moving parts are employed.

Having thus described the invention what is claimed as new and desired to be secured by Letters Patent is:

1. The combination with driving and driven members, of means connecting the same whereby the driven member may be driven in either direction by the driving member without occurrence of relative motion or back lash upon the reversal of direction of movement, said means comprising two rigid connecting elements each of which has a portion operatively connected to one of said members, and a device associated with the other of said members and comprising a movable part, a base part rigid with said member, upon which the movable part is mounted and relatively to which it moves, and means urging said movable part to move in one direction, said movable part being engaged by other portions of said connecting elements respectively, the movable part comprising a non-yielding abutment for transmitting driving force between the member on which it is mounted and either of said elements when the driving member is active and being adapted to move said elements in opposite directions to take up play when the driving member is inactive.

2. Mechanism of the class described, comprising in combination, reversible driving and driven members, and a driving connection between said members whereby the driven member may be driven in either direction by the driving member without occurrence of back lash or lost motion upon the reversal of direction of movement, said driving connection including two rigid connecting elements which move in unison but which act alternately in transmitting driving force, one being active for forward movement of the driving member and the other being active for reverse movement thereof, each of said elements having a portion operatively connected to one of said members, and a device associated with the other of said members and comprising a movable part, a base part rigid with said member upon which the movable part is mounted and relatively to which it moves, and means urging said movable part to move in one direction, said movable part being engaged by other portions of said connecting elements respectively, the movable part comprising a non-yielding abutment for transmitting driving force between the member on which it is mounted and either of said elements when the driving member is active and being adapted to move said elements in opposite directions to take up play when the driving member is inactive.

3. Mechanism of the class described, comprising in combination, reversible driving and driven members, and a driving connection between said members whereby the driven member may be moved in either direction by the driving member, said driving connection including two rigid connecting elements which move in unison but which act alternately in transmitting driving force, one being active for forward movement of the driving member and the other being active for reverse movement thereof, and power transmitting and play eliminating means mounted on one of said members said means having a movable part with opposed cam faces, and a base part upon which said movable part is mounted and relatively to which it moves, said base part being rigid with said member, each connecting element having a portion operatively connected to the same one of said members and another portion in operative engagement with one of the cam faces of said movable part, said means normally urging said elements in opposite directions to take up play when both are inactive, and constituting a non-yielding abutment when one only is active.

4. The combination set forth in claim 3 in which resilient means is provided for urging said movable part in a direction to cause each cam face to exert a camming action on the adjacent element.

5. The combination with a shaft and two gear sections rotatably mounted thereon of a radial arm carried by said shaft, a movable member carried by said arm, said member having opposed cam faces, members carried by said gear sections for acting on said cam faces respectively, and a spring normally urging said movable member in one direction.

6. The combination with two coaxial gear sections, of means mounted independently of and cooperating with both of said sections, said means including a support fixed to the shaft, a wedge-like device mounted on said support the opposed surfaces of which are in constant contact with parts of said gear sections respectively, and means yieldingly urging said device in a direction to cause relative rotation of said sections about their common axis.

7. A driving connection between two reversible rotatable shafts including a solid gear fixed on one shaft, a split gear mounted on the second shaft, an intermediate shaft having a split gear thereon, the sections of which mesh with the gear sections of the second shaft and with the solid gear, and means mounted on the second shaft for cooperation with the split gear also mounted thereon constituting a device for transmitting power between the shaft and gear and taking up all lost motion or back lash in the gear train.

8. The combination with two gear sections loosely mounted on a shaft of mechanism cooperating with both, whereby they are urged to rotate in opposite directions when neither is active in transmitting driving force and which mechanism provides a non-yielding abutment for transmitting driving force when only one becomes active, said mechanism comprising a support member rigid with the shaft, a wedge-like device mounted on the support for movement with respect to a fixed axis and having oppositely facing relatively inclined surfaces, and means which normally urges said device to move in such direction that its oppositely facing surfaces are in constant contact with portions of said gear sections, respectively.

9. The combination with two gear sections, loosely mounted on a shaft of mechanism cooperating with both to provide a solid abutment for transmitting driving force between either section and said shaft, but which mechanism permits relative movement of said sections when circumferential driving forces are simultaneously impressed on both, said mechanism comprising a support member rigid with the shaft, a device mounted on the support for movement relatively thereto and having oppositely facing relatively inclined surfaces, and means which normally urges said device to move in such direction that its oppositely facing surfaces are in constant contact with portions of said gear sections, respectively.

In testimony whereof I hereunto affix my signature.

HENRY W. NIEMAN.